Patented Nov. 4, 1924.

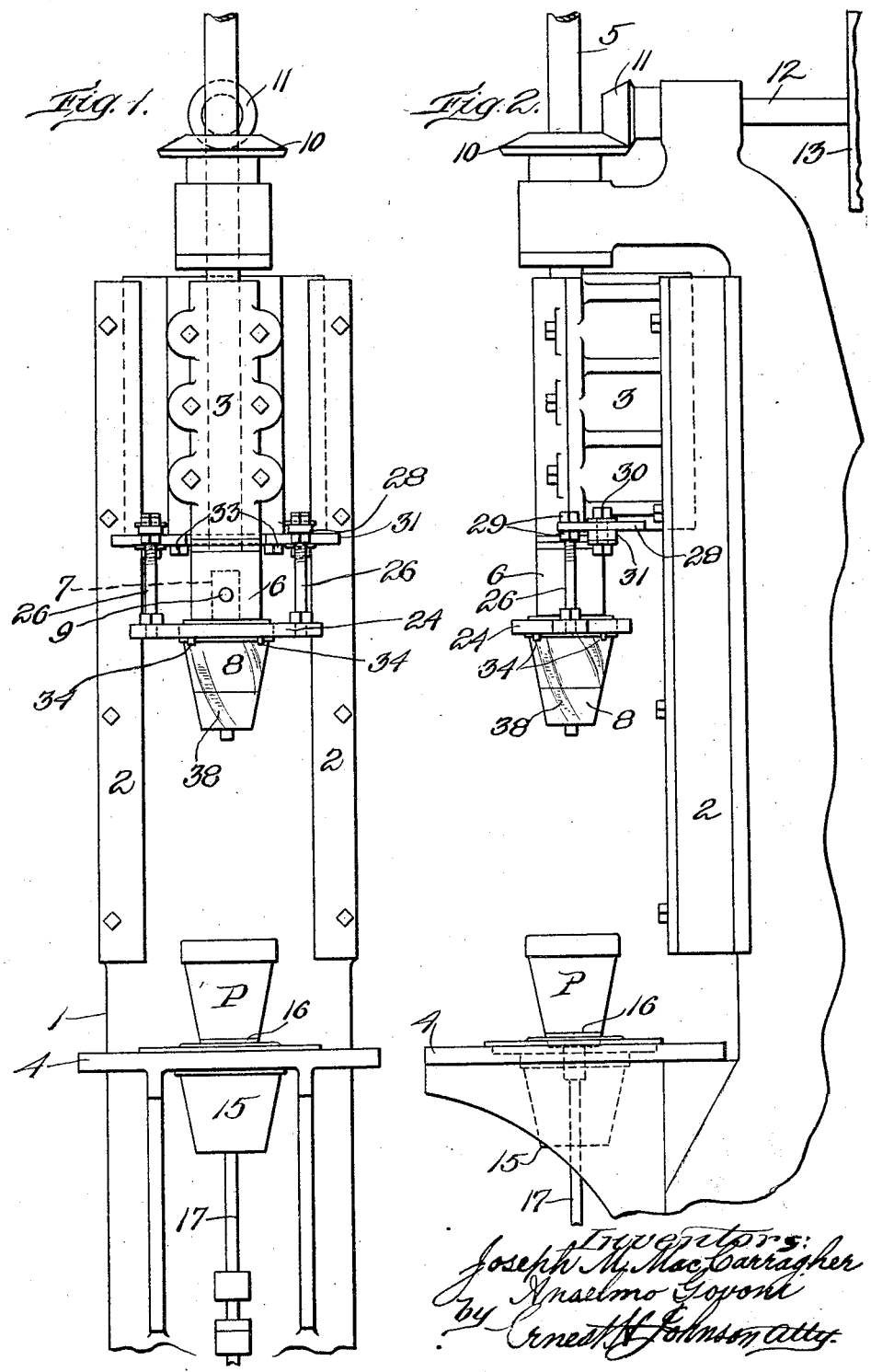

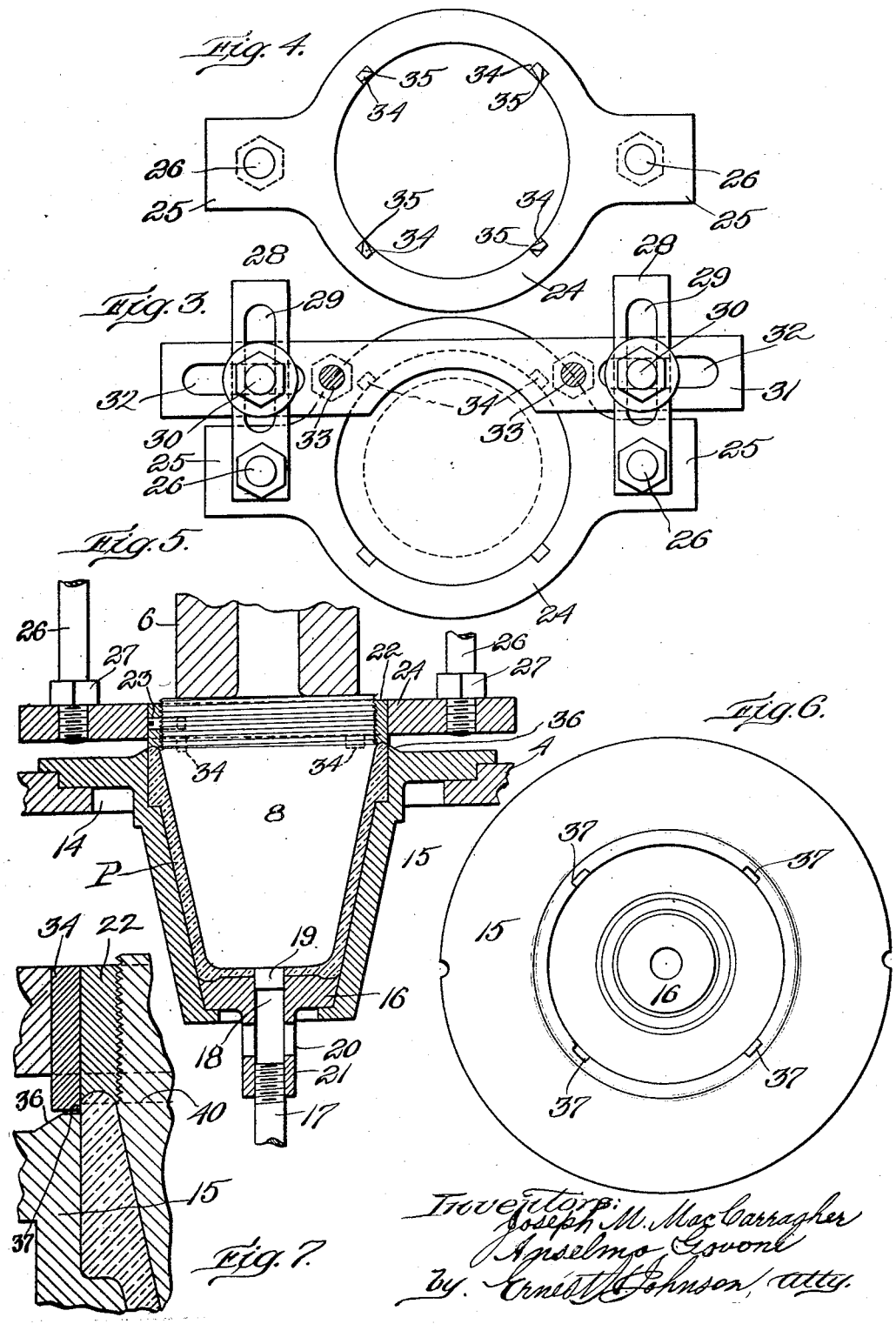

1,513,840

UNITED STATES PATENT OFFICE.

JOSEPH M. MacCARRAGHER AND ANSELMO GOVONI, OF SOMERVILLE, MASSACHUSETTS, ASSIGNORS TO A. H. HEWS & CO., INCORPORATED, OF CAMBRIDGE, MASSACHUSETTS, A CORPORATION OF MASSACHUSETTS.

POTTERY TRIMMER.

Application filed September 22, 1921. Serial No. 502,461.

*To all whom it may concern:*

Be it known that we, JOSEPH M. MACCARRAGHER, a citizen of the United States, residing at Somerville, in the county of Suffolk and State of Massachusetts, and ANSELMO GOVONI, a citizen of Italy, but a resident of Somerville, in the county of Middlesex and State of Massachusetts, have invented certain new and useful Improvements in Pottery Trimmers, of which the following is a specification.

This invention relates to pottery molding machines and it has for its object to provide an improved machine of this class.

Molding machines such as are used for the production of flower pots from clay comprise a stationarily supported mold into which the clay from which a pot is formed is deposited. After the clay is deposited in the mold a core mounted upon the lower end of a spindle that is vertically supported in bearings so as to both rotate and move endwise, is lowered into the mold and rotated. The entrance of the core into the mold distributes the clay within the latter so as to form said body of clay into a pot, and the purpose in rotating the core while it is within the mold is to uniformly distribute the clay and also expel air. The core includes an annular shoulder near its upper end which forms the chine of the pot and when the core is lowered into the mold this annular shoulder comes close to the mouth or rim of the mold, the surplus clay within the mold, however, being squeezed out of the latter between said annular shoulder and the rim of the mold as the shoulder comes into position close to the latter. When the core is in its lowermost position the annular shoulder is very close and almost closes the top of the mold but it does not serve to completely close the mold and as a result there is produced upon the article a very thin annular flange or feather upon the exterior of the molded articles adjacent to the chine thereof. Heretofore, it has been necessary to trim off this feather or flange by hand although several attempts have been made to embody automatic trimming mechanism in molding machines of this class but without success. The present invention has for its object to provide an improved pottery molding machine which will automatically trim the feather from the molded article. It is also an object of the present invention to provide a trimming attachment for pottery molding machines.

In the accompanying drawings:

Figure 1 is a front elevation of the upper portion of a pottery molding machine constructed in accordance with our invention.

Figure 2 is a side elevation of the machine shown in Figure 1.

Figure 3 is a plan view of the trimming attachment hereinafter described.

Figure 4 is an inverted plan view of the cutter head hereinafter described.

Figure 5 is a central vertical sectional view through the mold of the machine shown in Figure 1 showing the core in position within the same.

Figure 6 is a plan view of the mold hereinafter described.

Figure 7 is a sectional detail hereinafter described.

Having reference to the drawings, 1 is the frame of our improved machine for molding flower pots, said frame being constructed with ways 2 in which is slidably mounted a carriage 3 movable vertically in said ways relatively to a table 4 arranged beneath the same. The carriage 3 has journalled in it a vertical spindle 5 provided at its lower end with a head 6 formed with a socket to receive the shank 7 of a core 8 that is fastened within said socket by means of a screw 9. The spindle 5 has splined thereon a gear 10 that is driven by a pinion 11 fast on a shaft 12. This shaft 12 carries a tight pulley and a loose pulley one of which is shown at 13 and is driven in the usual fashion through a belt (not shown) that connects it with the main shaft of the machine. The carriage 3 is, as usual, raised and lowered through the usual mechanism not shown.

The table 4 is made with an aperture 14 within which is secured the mold 15 constructed as usual and having, as usual a false bottom 16 secured to the upper end of a vertically movable rod 17. The false bottom 16 is made with a central aperture 18 to receive the punch 19 of the core 8, said punch serving to form the usual hole through the bottom of the pot being molded. The discs of clay forced downward into the aperture 18 by punch 19 discharge through lateral openings 20 provided in the depending sleeve 21 of false bottom 16.

The upper portion of the core 8 is exteriorly threaded to receive upon it the chine forming ring 22, said ring being fixed in adjusted position by means of a screw 23. The chine forming ring 22 is formed upon its lower end with an annular groove adapted to form a rounded chine upon the pot being molded, and the reason for mounting the ring 22 upon the core 8 as described is that continued use of the ring 22 destroys the lower end thereof so that it is necessary to provide for removal of this ring so that its lower end can be reshaped. As will be clear, the construction described permits the ring to be removed when it is necessary to re-shape the lower end thereof and by reason of the screw thread connection between the core and said ring the latter may be adjusted on the core to compensate for the shortening of the ring due to the re-shaping operation.

It is not new to provide molding machines of this kind with chine forming rings removably and adjustably fastened to the core 8, but it is a novel feature of this invention to construct the chine forming ring 22 with a cylindrical exterior upon which is mounted a cutter head 24. This cutter head 24, as shown in Figures 3 and 4, is a metal ring formed at opposite sides thereof with laterally extending arms 25 having threaded apertures formed therethrough into which are screwed the lower ends of two posts 26. Check nuts 27 serve to lock the posts against displacement in said apertures. The two posts 26 extend upwardly from the arms 25 and the upper portions thereof are threaded as shown in Figures 1 and 2. The threaded portion of each post 26 extends through an aperture formed in an arm 28, and check nuts 29 mounted on said posts above and below said arm rigidly fasten the two together. The rear portion of each arm 28 is formed with a slot 29 through which extends a bolt 30 by means of which the arm is clamped to one end of a cross head 31. The end portions of the cross head 31 are formed with longitudinal slots 32 through which the bolts 30 extend. It will thus be clear that the bolt and slot connection between the arms 28 and cross head 31 permit the cutter head ring 24 to be accurately centered with relation to the axis of spindle 5. The cross head 31 extends across the underside of head 3 and is secured to the latter by means of screws 33, Figures 1 and 3, so that said cross head is, in effect, part of the head 3 and moves up and down with it.

As shown in Figures 3, 4 and 5, the cutter head 24 is made with four depending cutters 34 whose cutting edges 35 occupy positions close to the cylindrical exterior of the chine forming ring 22 and, as will be clear from Figure 5, the lower ends of the cutters 34 occupy a plane that is below the plane of the lower end of the chine forming ring 22. In practice the lower ends of the cutters 34 are a little over one thirty-second of an inch below the plane of the lower end of chine forming ring 22. The mold 15, Figures 5 and 6, is made at its mouth with a rim 36 which terminates in a knife edge, and when the core 8 is fully within the mold, the lower outer corner of the chine forming ring 22 approaches very close to the knife edge of the rim 36 of the mold, but not so close as to prevent the formation of the annular feather referred to above, said feather being produced through the clay squeezing out through the joint between rim 36 and ring 22. In the improved machine herein illustrated the rim 36 of the mold is formed with four recesses 37 positioned so as to be alined vertically, each with one of the cutters 34, so that when the core 8 is lowered into the mold and reaches its lowermost position therein the cutters 34 extend across the plane of the joint between the chine forming ring 22 and rim 36 with their lower ends occupying the recesses or notches 37. For reasons well understood by those skilled in this art, it is customary to form the core 8 with more or less spiral surfaces 38 called "flats", Figures 1 and 2, and these flats not only assist in effecting the escape of air from within the mold but they also cause the article being molded to rotate within the core. It will therefore be clear that when the core 8 and cutter head 24 are in their lowermost positions as shown in Figure 5, and the pot P that is being molded is rotated with the core, the knives 34 will trim the feather from the molded article immediately adjacent the chine thereof.

The machine is operated as follows: While the machine is at rest with the core 8 and cutter head 24 in their uppermost positions a quantity of clay from which the article is to be formed is deposited within the mold 15, and it is customary in order that there be sufficient clay to form the article, to place into the mold more than enough for that purpose. The shaft 12 is then started in motion and the head 3 lowered to carry the core 8 down into the mold. As the core passes down into the mold its rotary motion distributes the clay uniformly within the mold and forces it upwardly causing the surplus clay to squeeze out between ring 22 and rim 36, and as the core 8 nears its lowermost position the lower end portions of the cutters 34 are carried beyond the joint between ring 22 and rim 36 so that rotary motion imparted to pot P by the rotating core 8 causes said cutters to trim the feather from the article. In Figure 7 the dotted line at 40 indicates the joint between ring 22 and rim 36 and in said figure the lower end of the cutter 34 is shown as occupying its position within one of the recesses 37 of the mold 15 with its lower end below said joint.

It will be clear from the above description that when the pot P is removed from the mold it is complete in every respect except for baking. Heretofore it has been necessary after removing the article from the mold to manually trim the feather from the chine. When the operation of molding a pot is completed the core 8 and cutter head 24 are moved into their uppermost retracted position shown in Figures 1 and 2 and at the same time the stem 17 is moved upwardly by mechanism not shown to cause the false bottom 16 to lift the completed article out of the mold as shown in said figures.

What we claim is:

1. In a pottery molding machine, the combination of a mold having a recess formed at its rim that opens into the cavity of said mold; a core movable into and out of said mold provided with a chine shaping shoulder; and a feather removing member movable into a position within said recess and immediately adjacent the side of the article being molded so that it is in the plane of the joint between said shoulder and the rim of the mold when the core is fully within the latter.

2. In a pottery molding machine, the combination of a mold having a recess formed at its rim that opens into the cavity of said mold; a rotatable core movable into and out of said mold provided with a chine shaping shoulder; a feather removing cutter, and a movable but non-rotatable support on which said cutter is mounted, said support being movable toward and from said mold to position said cutter within said recess immediately adjacent the side of the article being molded so that said cutter is in the plane of the joint between said shoulder and the rim of the mold when the core is fully within the latter.

3. In a pottery molding machine, the combination of a mold having a plurality of recesses formed at its rim which open into the cavity of said mold; a rotatable core movable into and out of said mold; a ring adjustably mounted upon said core whose lower end serves as a chine shaping shoulder; a plurality of feather removing cutters, and a movable but non-rotatable annular cutter head surrounding said ring and carrying said cutters, said cutter head being movable toward and from said mold to position said cutters each within one of said recesses immediately adjacent the side of the article being molded so that said cutter is in the plane of the joint between said shoulder and the rim of the mold when the core is fully within the latter.

4. A feather removing attachment for pottery molding machines comprising a separate annular cutter head adapted to surround the core of the machine; a feather removing cutter mounted upon said cutter head, and means for fastening said cutter head to the core support of the molding machine.

5. A feather removing attachment for pottery molding machines comprising a separate annular cutter head adapted to surround the core of the machine; a plurality of feather removing cutters mounted upon said cutter head, and means for fastening said cutter head to the core support of the molding machine with provision for lateral and vertical adjustment.

6. A feather removing attachment for pottery molding machines comprising a separate annular cutter head adapted to surround the core of the machine; a plurality of feather removing cutters mounted upon said cutter head, and means for fastening said cutter head to the core support of the molding machine with provision for lateral, rotative and vertical adjustment thereof.

JOSEPH M. MacCARRAGHER.
ANSELMO GOVONI.